United States Patent
Sørensen (10) Patent No.: US 10,432,062 B2
(45) Date of Patent: Oct. 1, 2019

(54) LINEAR ACTUATOR

(71) Applicant: LINAK A/S, Nordborg (DK)

(72) Inventor: Rene Sørensen, Gråsten (DK)

(73) Assignee: LINAK A/S, Nordborg (DK)

( * ) Notice: Subject to any disclaimer, the term of this patent is extended or adjusted under 35 U.S.C. 154(b) by 199 days.

(21) Appl. No.: 15/329,138

(22) PCT Filed: Jul. 29, 2015

(86) PCT No.: PCT/DK2015/000031
§ 371 (c)(1),
(2) Date: Jan. 25, 2017

(87) PCT Pub. No.: WO2016/015731
PCT Pub. Date: Feb. 4, 2016

(65) Prior Publication Data
US 2017/0222516 A1    Aug. 3, 2017

(30) Foreign Application Priority Data
Jul. 29, 2014  (DK) ................................ 2014 00424

(51) Int. Cl.
*H02K 7/06*         (2006.01)
*F16H 25/20*        (2006.01)
(Continued)

(52) U.S. Cl.
CPC ............... *H02K 7/06* (2013.01); *F16H 25/20* (2013.01); *H02K 5/04* (2013.01); *H02K 7/1166* (2013.01);
(Continued)

(58) Field of Classification Search
CPC ........... H02K 5/04; H02K 7/06; H02K 7/1166
See application file for complete search history.

(56) References Cited

U.S. PATENT DOCUMENTS 4,801,833 A *  1/1989  Dye ...................... H01R 39/38
                                                      310/239
4,918,363 A    4/1990  Hollis et al.
(Continued)

FOREIGN PATENT DOCUMENTS

DE    20 2004 00095 U1    4/2004
WO    2013/184656 A1      12/2013

OTHER PUBLICATIONS

International Search Report for corresponding patent application No. PCT/DK2015/000031 dated Feb. 1, 2016.

*Primary Examiner* — Dang D Le
(74) *Attorney, Agent, or Firm* — Renner Otto Boisselle and Sklar LLP (57) ABSTRACT

A linear actuator includes a housing with an electric motor, which through a transmission drives a spindle with a spindle nut. To the spindle nut is secured a tubular adjustment element, which is guided in a guide tube. A bushing is secured at the rear end of the guide tube for securing the guide tube to the chassis of the actuator. Expediently, the securing is done with stampings from the outer side of the mounting bushing and into the guide tube. These stampings are appropriately done opposite channels, such as screw channels in the guide tube, such that the stampings are received in the channels and do not protrude into the guide tube and prevent the movement of the spindle nut and the adjustment element.

8 Claims, 8 Drawing Sheets

(51) Int. Cl.
*H02K 5/04* (2006.01)
*H02K 7/116* (2006.01)
(52) U.S. Cl.
CPC .. *F16H 2025/204* (2013.01); *F16H 2025/209* (2013.01); *F16H 2025/2031* (2013.01)

(56) References Cited

U.S. PATENT DOCUMENTS 8,772,991 B2 * 7/2014 Yamamoto ........... B60K 7/0007
310/75 R
2014/0157921 A1 6/2014 Wu

* cited by examiner

LINEAR ACTUATOR

This application is a national phase of International Application No. PCT/DK2015/000031 filed a Jul. 29, 2015 and published in the English language, which claims priority to Denmark Application No. PA 2014 00424 filed Jul. 29, 2014, which is hereby incorporated herein by reference in its entirety.

The invention relates to a linear actuator comprising a housing, an electric motor, a transmission, a spindle in connection with the transmission, a spindle nut on the spindle, a tubular adjustment element, which with a rear end is connected to the spindle nut, a guide tube for the tubular adjustment element, where the guide tube with a rear end is screwed fixedly onto a chassis of the actuator.

The probably most common type of linear actuator comprises a front mounting in a front end of the tubular adjustment element and a rear mounting in a rear end of the housing for mounting of the actuator. The forces from the load are led as a compression or pull force between rear and front mounting through the tubular adjustment element, spindle nut and spindle. When subject to compression, the tubular adjustment element and the spindle are thus affected to deflection. In particular there is a potential "break point", where the tubular adjustment element through the spindle nut is connected to the spindle. The tubular adjustment element is guided in two places namely by guiding the spindle nut in the guide tube and by guiding in the front end of the guide tube. By guiding the spindle nut internally in the guide tube, the spindle, which freely protrudes outwards internally in the tubular adjustment element, is simultaneously guided. Due to this tendency to deflection and buckling, transversal forces are transferred to the guide tube and moreover, possible transversal forces caused by the incorporation of the actuator in a given structure will also be transferred to the guide tube. By patient lifters it is e.g. commonly known that the staff in some situations will move these by gripping around the guide tube of the actuator. All things considered this results therein that the guide tube with its rear end will have to be well and solidly embedded in the actuator.

Figure 3:
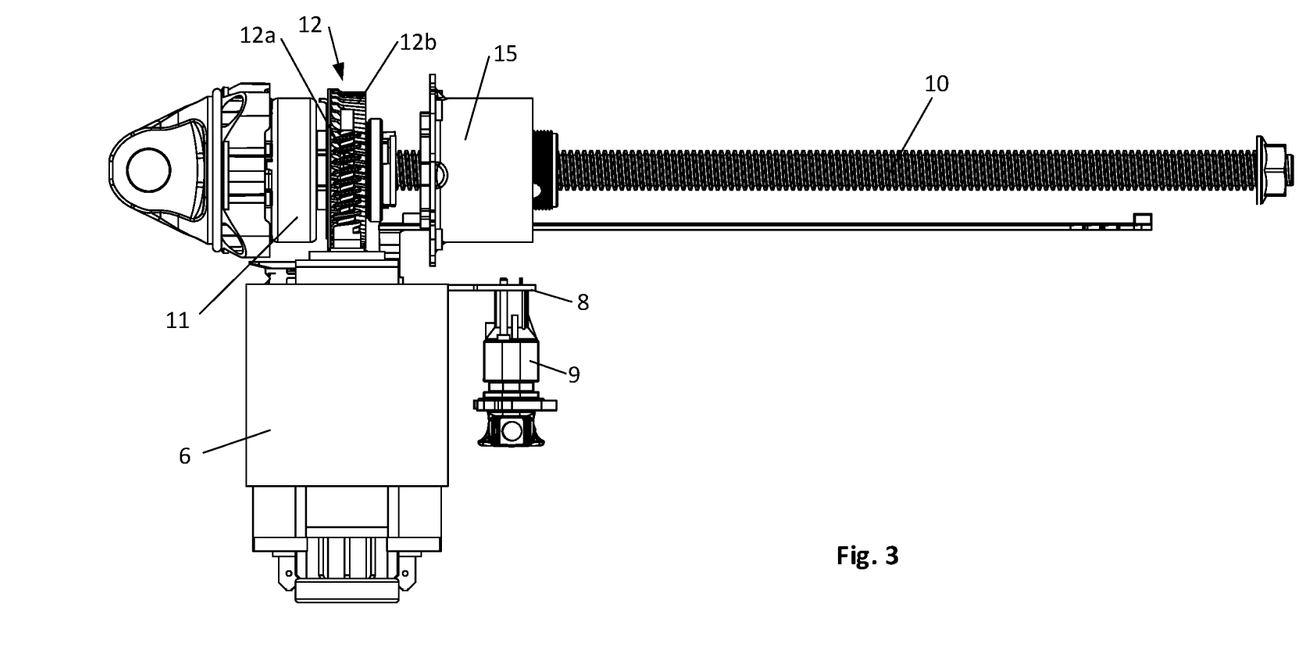
FIG. 3, the same as FIG. 2, but further without guide tube and chassis.
Figure 4:
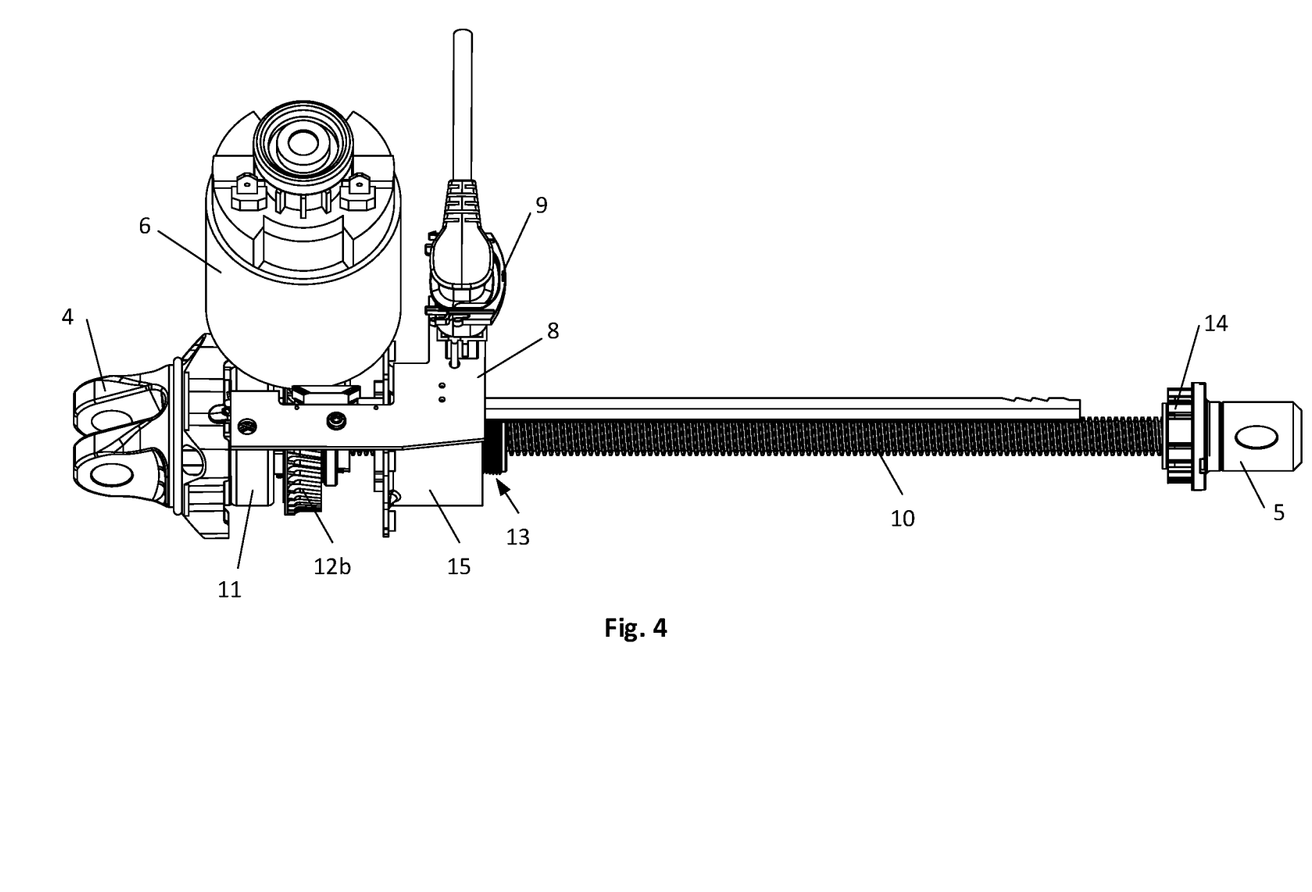
FIG. 4, the same as FIG. 3, seen from the other side and where the front mounting and bushing in the guide tube are shown, FIG. 5, a perspective view of a rear most part of the guide tube with mounting bushing, FIG. 6, guide tube with mounting bushing seen directly from the front, FIG. 7, a longitudinal section through the guide tube and mounting bushing in FIG. 5, FIG. 8, an exploded view of the linear actuator, FIG. 9, an exploded view of the electric motor and the chassis shown in perspective, FIG. 10, an exploded view of the electric motor and the chassis shown in a different perspective, and FIG. 11, an exploded view shown in perspective where the electric motor and the chassis are assembled, FIG. 12, an exploded view of a second embodiment of the electric motor and the chassis shown in perspective, and FIG. 13, an exploded view of the second embodiment of the electric motor and the chassis shown in a different perspective.
Figure 5:
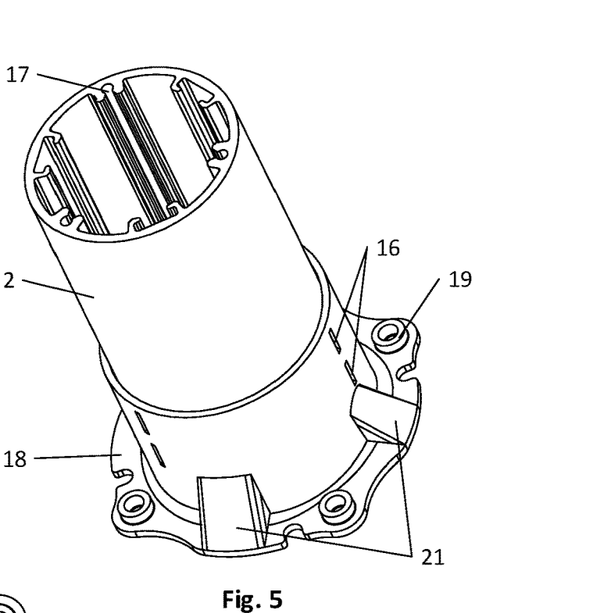
Figure 6:
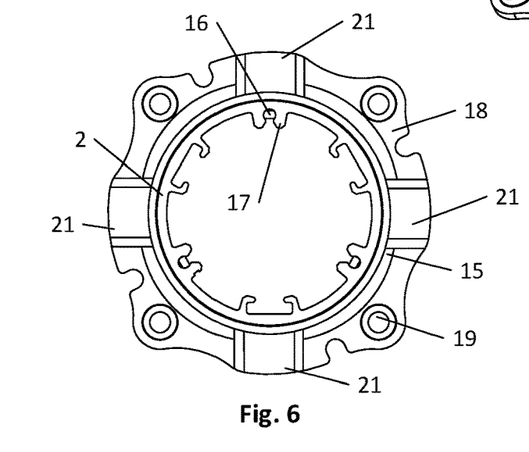
Figure 7:
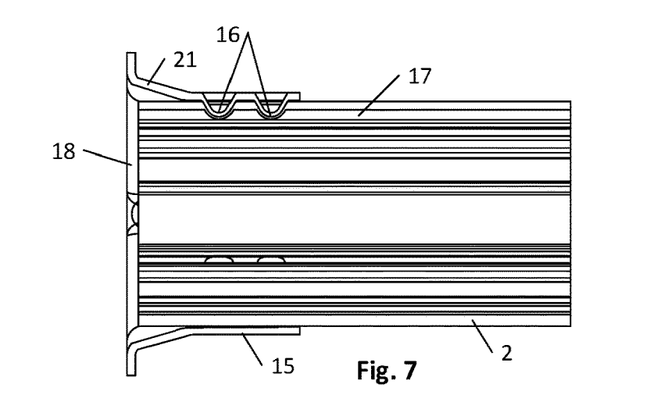
Figure 8:
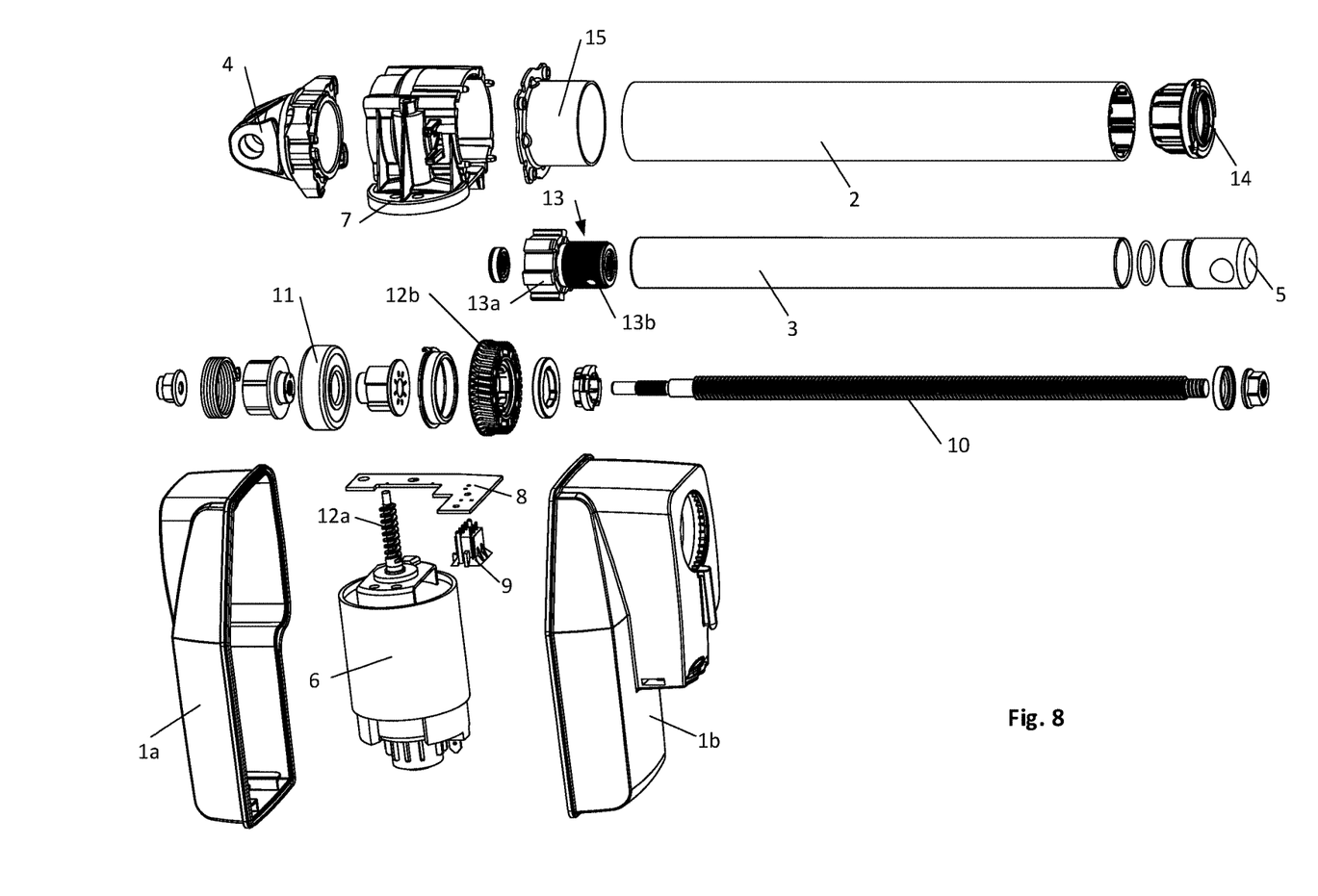

EP 0 531 247 A1 to LINAK A/S thus discloses a linear actuator where the housing in a bottom part has an integrated tubular part for receiving the rear most portion of the guide tube. FIG. 3 of EP 0 662 573 B1 to LINAK A/S shows a linear actuator with an L-shaped housing where almost the entire guide tube is embedded in the housing. WO2006/089554 A1 to LINAK A/S shows the same basic construction, but where the guide tube protrudes out in front of the housing. These are, however, relatively expensive constructions as the housings are large and complex. WO 2009/086834 A1 to LINAK A/S discloses a linear actuator where the guide tube protrudes freely out of the housing and only with a small part of the rear most portion is embedded in a "well" in the housing. A similar construction is known from DE 20 2004 002 254 U1 to Dewert Antriebs- und Systemtechnik GmbH & Co KG. In these three construction types the transversal forces are transmitted to the housing, which must be dimensioned to absorb these, and also for these reasons become relatively expensive. WO 02/29284 A1 to LINAK A/S discloses a linear actuator of a somewhat different type, meaning that it comprises a carrying chassis while the housing only functions as "packaging". The guide tube is here with its rear end secured to the carrying chassis. A similar construction type is known from WO2011/057632 A1 to LINAK A/S, where the guide tube is designed with screw channels and is screwed onto a base on the carrying chassis. From WO 2005/079134 A2 to LINAK A/S a more powerful version of a linear actuator is known, where the guide tube with its rear end is screwed onto the housing and further is retained by means of a pair of claws a distance in on the guide tube. Again, this solution is a little more complex and expensive.

The purpose of the invention is to provide a more production and assembly friendly linear actuator, including achieving a sturdy and stable securing of the guide tube. Moreover, to achieve an improved mounting and fixation of the electric motor in the chassis.

This is achieved according to the invention by designing the actuator as stated in claim 1, where the guide tube at the rear end is equipped with a mounting bushing secured to this and where the bushing on its side is secured to the chassis of the actuator.

In an embodiment the securing is done by means of stampings from the outer side of the mounting bushing and into the guide tube. In that the stampings are done opposite channels, such as screw channels in the guide tube, in a manner in which the deformations are received in the channels, the deformations do not protrude into the rest of the hollow of the guide tube and thus cannot interrupt the movement of the spindle nut and the adjustment element. The outer diameter of the guide tube and the inner diameter of the mounting bushing are adapted to each other such that the guide tube with a forced fit protrudes into the mounting bushing, by which a good stability between the mounting bushing and the guide tube is achieved. In an embodiment a rear end of the mounting bushing is designed with a radially protruding flange comprising screw holes with internal threads. This contributes to an easy mounting, just as it in terms of production engineering is easy to manufacture. In an embodiment the mounting bushing with guide tube is secured with the rear mounting around the chassis of the linear actuator, in that screws are led from the rear mounting through the chassis to the screw holes in the mounting bushing, by which the rear mounting and the mounting bushing are tightened around the chassis, resulting in a simple mounting of both the guide tube as well as the rear mounting, just as it ensures a sturdy and stable mounting. In a particularly expedient embodiment the mounting bushing is made from steel and the guide tube from light metal, such as aluminum, which opens up for a production friendly design of the mounting bushing and assembly with the guide tube. As an example, the guide tube can be cut from standard lengths of tubes, while the mounting bushing can be made by means of simple bending, punching and deep drawing methods.

In an embodiment the chassis comprises at least one lock hole and the front end of the electric motor comprises at least one flap prepared for engagement with the lock wheel, by which the electric motor can be fixed to the chassis.

In a second embodiment the chassis comprises at least one depression and the front end of the electric motor comprises at least one protrusion prepared for engagement with the depression. The rim area of the depression can be raised a little compared to the mounting surface and can e.g. be designed as a wedge. When the protrusion is brought into engagement with the depression on the mounting surface the assembler will, due to the raised rim area of the depression, register an auditory or tactile signal when the protrusion passes the rim area. Thus, the protrusion and the depression functions as a snap lock. When the protrusion has passed the rim area of the depression it enters into engagement with the depression. This embodiment ensures an improved mounting and fixation of the electric motor in the chassis.

After fixation of the electric motor in the chassis, these can be secured to each other with fastening means such as a screw.

A linear actuator according to the invention will be described more fully below with reference to the accompanying drawing. The drawing shows.

Figure 1:
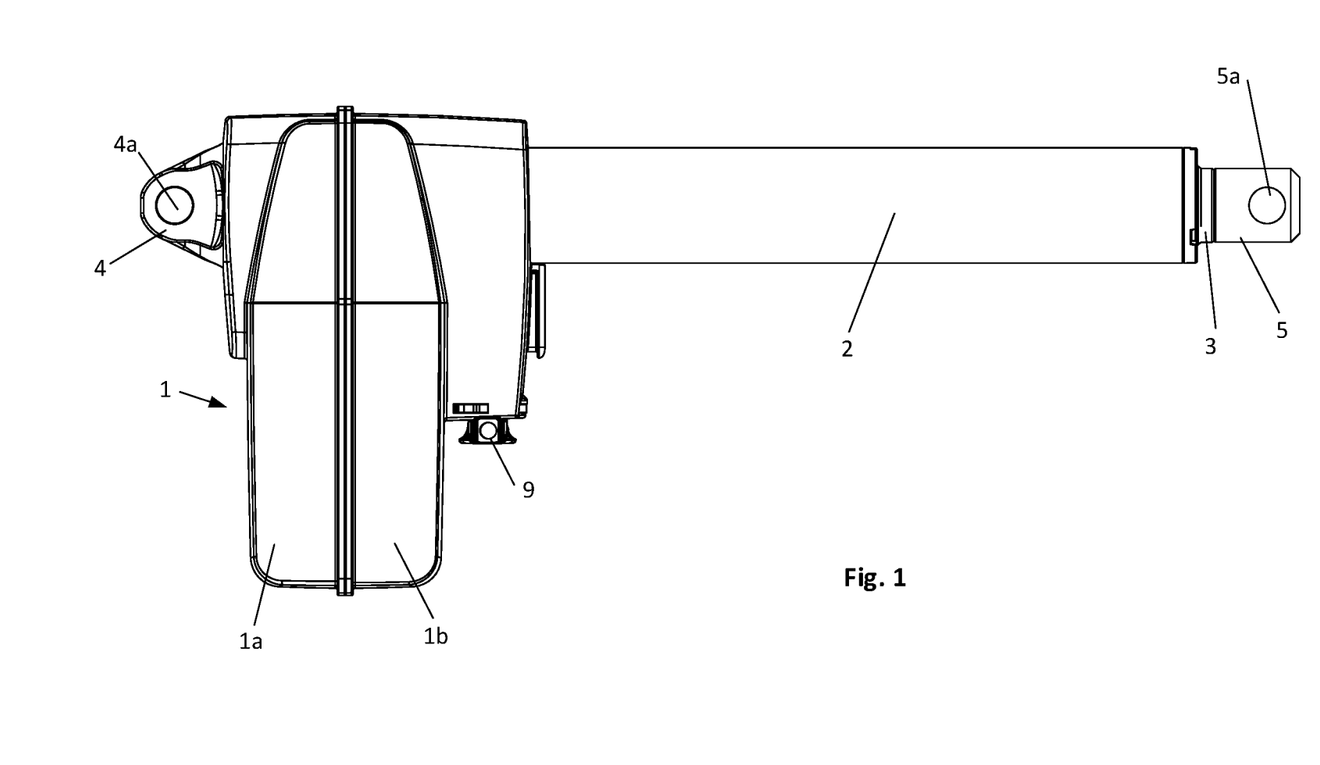
FIG. 1, a linear actuator.
Figure 2:
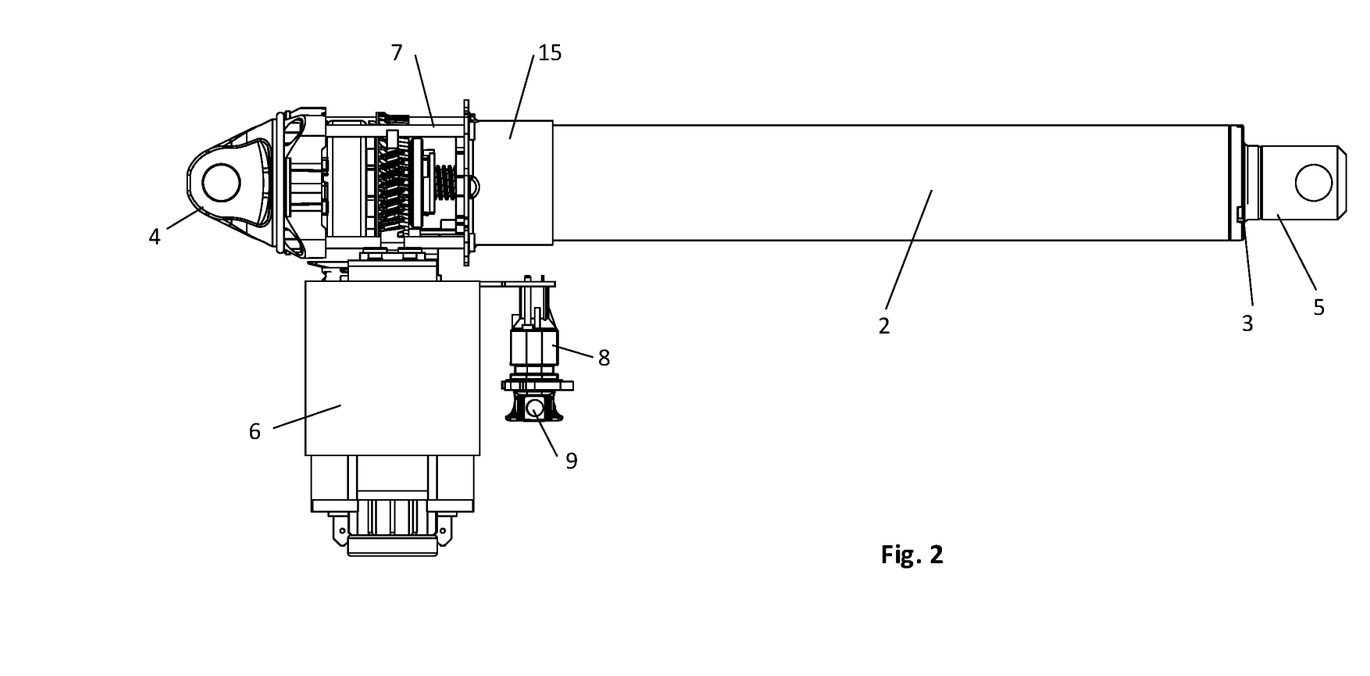
FIG. 2, the same as FIG. 1, but without housing.

The linear actuator outlined in the drawing comprises a housing 1 consisting of a first portion 1*a* and a second portion 1*b*. Further, the linear actuator comprises a guide tube 2 and a tubular adjustment element 3 guided in this. For mounting the actuator, a rear end of the housing 1 is equipped with a rear mounting 4 and in a front end of the tubular adjustment element 3 there is a front mounting 5. Both the rear mounting 4 as well as the front mounting 5 has an eye, a through-going hole 4*a*,5*a* for a bolt, rivet, axle pin or the like, by means of which the linear actuator can be secured. The linear actuator is thus able to rotate about a central axis through the eye both in the rear mounting 4 as well as in the front mounting 5, such that the linear actuator automatically adapts to the position of the two elements in the structure to which the linear actuator is secured, such that the forces ideally always run axially in the longitudinal direction of the tubular adjustment element 3. As it appears from FIG. 2, the linear actuator comprises an electric motor 6, typically a reversible electric motor, which can be either a DC or AC motor for low voltage or mains voltage. To a front end of the electric motor 6 a chassis 7 in the shape of a housing is mounted, which together with the electric motor 6 constitutes the main components of the linear actuator.

The rear mounting 4 is mounted on a rear end of the chassis 7 while the guide tube 2 with a rear end is mounted to a front end of the chassis 7. In connection with the electric motor 6 there is a printed circuit board 8 with a plug 9 for connecting the linear actuator to a power supply and possibly also to an electric controller.

The linear actuator further comprises a spindle 10, where a bearing 11 is mounted on a rearmost part thereof, by which the spindle is embedded and mounted in the chassis 7. The spindle 10 is driven by the electric motor 6 through a transmission 12, here a worm gear, where an extension of the shaft of the electric motor 6 is designed as a worm 12*a* in engagement with a worm wheel 12*b*, mounted on the spindle 10.

The spindle 10 has external threads, where a spindle nut 13, which is secured against rotation having internal threads, is in engagement with the threads of the spindle 10. A rear most part of the spindle nut 13 is equipped with fins 13*a*, which extends into axially running tracks internally in the guide tube and thus both secures the spindle nut 13 against rotation and guides the spindle nut 13 in the guide tube 2.

A front most part of the spindle nut 13*b* is provided with external threads for mounting of the tubular activation element 3, which in a rearmost end is provided with corresponding internal threads, such that the activation element can be screwed onto the spindle nut 13. In the front end of the guide tube 2 there is a guide bushing 14 as guide for the tubular adjustment element 3, just as the guide bushing 14 can be designed with a seal to prevent ingress of dust and moisture between the guide bushing 4 and the tubular adjustment element 3. The seal can be an O-ring, lip seal or the like.

For mounting of the guide tube 2 to the front end of the chassis 7 a tubular mounting bushing 15 is secured to the rear end of the guide tube. The outer diameter of the guide tube 2 and the inner diameter of the mounting bushing 15 is adapted to each other such that the guide tube 2 with a fixed fit protrudes into the mounting bushing 15, such that possible transversal forces on the guide tube 2 is transferred to the mounting bushing 15. For retaining the guide tube 2 in the axial direction stampings 16 are done from the outer side of the mounting bushing 15 and into the guide tube 2. These stampings 16 are done opposite screw channels 17 in the guide tube 2, such that the deformations are received in the screw channels 14 and thus do not protrude into the rest of the hollow of the guide tube, such that they do not prevent or somehow affect the movement of the spindle nut and the tubular adjustment element 3.

The rear end of the mounting bushing 15 is designed with a radially protruding flange 18 containing screw holes 19 with internal threads. The mounting bushing 15 with mounted tubular adjustment element 3 is secured with the rear mounting 4 around the chassis 7 in that screws 20 are led from the rear mounting 4 through the chassis 7 to the screw holes 19 in the mounting bushing 15 for the guide tube 2, by which the rear mounting 4 and the mounting bushing 15 are tightened around the chassis 7. For increasing the stability between the flange 18 and the rear of the mounting bushing 15 deep drawn slanting support sections 21 can be provided.

Figure 9:
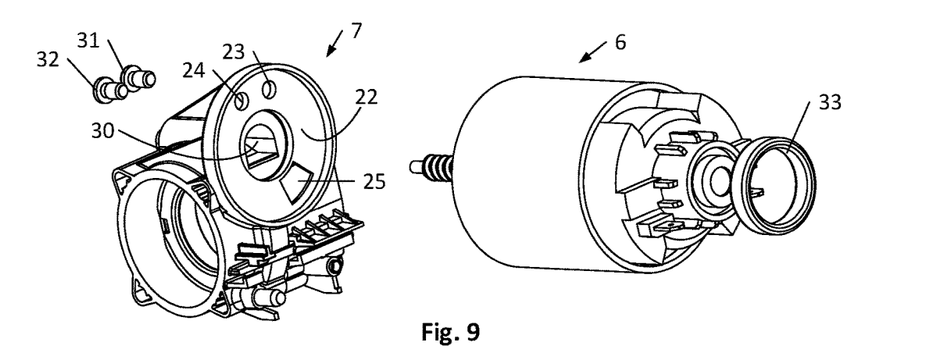
Figure 10:
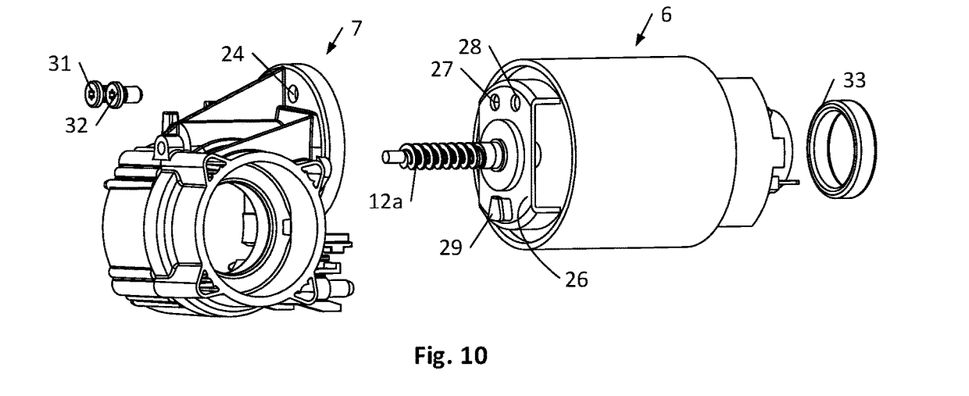
Figure 11:
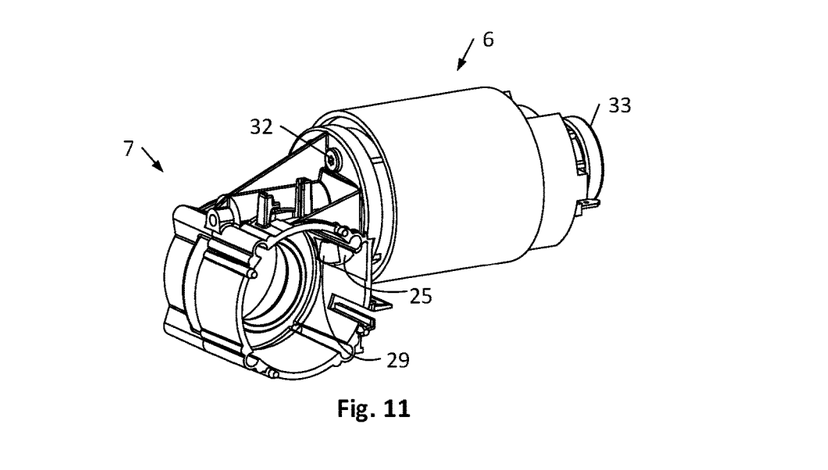

FIG. 9-11 show how the electric motor 6 is mounted in the chassis 7. Thus, the chassis 7 comprises a mounting surface 22 with two through-going holes 23,24 and a lock hole 25. The front end of the electric motor 6 comprises a flange 26 with two screw holes 27,28 having internal threads and a flap 29, which in this shown embodiment is hinge-shaped. The flap 29 is prepared for engagement with a side of the lock hole 25 in the mounting surface 22 of the chassis 7. For mounting the electric motor 6 in the chassis 7 the worm 12*a* of the electric motor is led into a shaft hole 30 in the chassis 7. Simultaneously, the hinge-shaped flap 29 is led into the lock hole 25 in the mounting surface 22.

Subsequently, the electric motor 6 is rotated such that the flap 29 is brought into engagement with a side of the lock hole 25. Thus, the electric motor 6 is fixed to the chassis such that the holes 23,24 in the mounting surface 22 are aligned with the screw holes 27,28. Subsequently, fastening means in the shape of the screws 31,32 are led through the holes 23,24 and are brought into engagement with the threads of the screw holes 27,28 in the flange 26 of the electric motor, by which the electric motor 6 is secured to the chassis 7.

Figure 12:
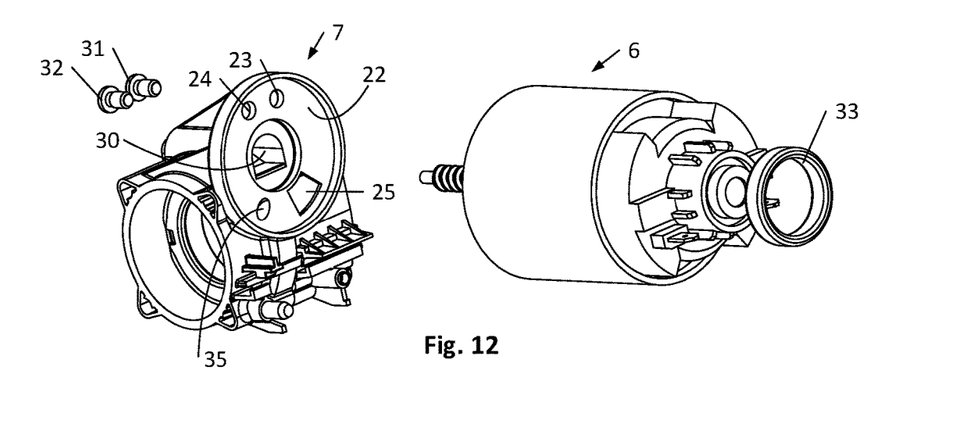
Figure 13:
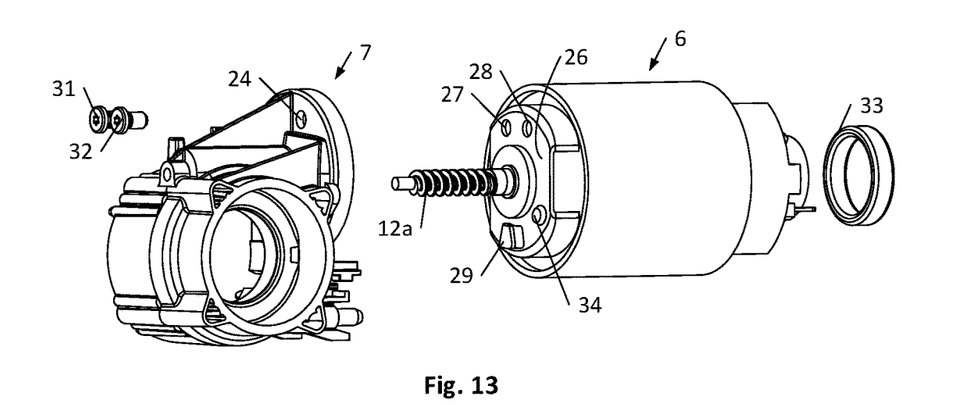

FIGS. 12 and 13 show an embodiment where the flange 26 on the electric motor 6 further comprises a protrusion 34 in the shape of a collar, pin or the like. The mounting surface 22 on the chassis 7 has a corresponding depression 35 prepared for engagement with the protrusion 34 of the flange. The depression 35 can be of a circular shape or be designed as a groove. The rim area of the depression 35 can with advantage be raised a little compared to the mounting surface and can e.g. be designed as a wedge.

In this embodiment the electric motor 6 is mounted in the manner described above. When the electric motor 6 is rotated the flap 29 is also here brought into engagement with a side of the lock hole 25. Further, the protrusion 34 on the flange 26 is brought into engagement with the depression 35 on the mounting surface 22. Due to the raised rim area of the depression 35 the assembler will register an auditory or tactile signal when the protrusion 34 passes the rim area of the depression 35. Thus, the protrusion 34 and the depression 35 function as a snap lock. Subsequently, the protrusion 34 enters into engagement with the depression 35 thus contributing to an easier mounting and an improved fixation of the electric motor 6 in the chassis 7 before these are secured to each other by means of the screws 31,32.

From FIGS. 9-13 it appears that the electric motor 6 comprises a gasket 33 in the shape of a rubber ring for dampening of the vibrations from the electric motor 6.

The invention claimed is:

1. A linear actuator comprising a housing, an electric motor a transmission, a spindle in connection with the transmission, a spindle nut on the spindle, a tubular adjustment element, which with a rear end is connected to the spindle nut, a guide tube for the tubular adjustment element, a chassis in which the guide tube with a rear end is secured, and a mounting bushing in which the rear end of the guide tube is secured and where the mounting bushing is secured to the chassis, wherein stampings are done from an outer side of the mounting bushing and into the guide tube for retaining the guide tube, wherein the stampings are made opposite of screw channels in the guide tube and the stampings are received in the screw channels.

2. The linear actuator of claim 1 wherein an outer diameter of the guide tube and an inner diameter in the mounting bushing are adapted to each other, wherein the guide tube with a forced fit protrudes into the mounting bushing.

3. The linear actuator of claim 1 wherein a rear end of the mounting bushing is configured with a radially protruding flange comprising screw holes with internal threads.

4. The linear actuator of claim 3 wherein the mounting bushing with guide tube is secured with the rear mounting around the chassis, in that screws are led from the rear mounting through the chassis to the screw holes in the mounting bushing, by which the rear mounting and the mounting bushing are tightened around the chassis.

5. The linear actuator of claim 1 wherein the mounting bushing is of steel and the guide tube is of light metal, such as aluminum.

6. The linear actuator of claim 1 wherein the chassis comprises at least one lock hole and where a front end of the electric motor comprises at least one flap prepared for engagement with the lock hole, by which the electric motor can be fixed to the chassis.

7. The linear actuator of claim 6 wherein the chassis comprises at least one depression and where the front end of the electric motor comprises at least one protrusion prepared for engagement with the depression.

8. The linear actuator of claim 1 wherein the chassis comprises at least one through-going hole and where a front end of the electric motor comprises at least one hole prepared for engagement with fastening means, and where the fastening means) are led through the through-going hole, by which the electric motor is secured to the chassis.

* * * * *